(12) United States Patent
Ghani

(10) Patent No.: US 10,876,819 B2
(45) Date of Patent: Dec. 29, 2020

(54) MULTIVIEW DISPLAY FOR HAND POSITIONING IN WEAPON ACCURACY TRAINING

(71) Applicant: Rod Ghani, Phoenix, AZ (US)

(72) Inventor: Rod Ghani, Phoenix, AZ (US)

( * ) Notice: Subject to any disclaimer, the term of this patent is extended or adjusted under 35 U.S.C. 154(b) by 375 days.

(21) Appl. No.: 16/120,441

(22) Filed: Sep. 3, 2018

(65) Prior Publication Data

US 2020/0072578 A1    Mar. 5, 2020

(51) Int. Cl.
*F41G 3/26*       (2006.01)
*G06F 3/01*       (2006.01)
*G06K 9/00*       (2006.01)
*G09G 5/14*       (2006.01)

(52) U.S. Cl.
CPC .............. *F41G 3/2611* (2013.01); *G06F 3/01* (2013.01); *G06K 9/00375* (2013.01); *G09G 5/14* (2013.01)

(58) Field of Classification Search
CPC ........ F41G 3/26; F41G 3/2605; F41G 3/2611; F41G 3/2616; F41G 3/2622
USPC .................................. 434/11, 16, 19, 20, 21
See application file for complete search history.

(56) References Cited

U.S. PATENT DOCUMENTS

| | | | |
|---|---|---|---|
| 4,619,616 A | 10/1986 | Clarke | |
| 4,657,511 A | 4/1987 | Allard | |
| 4,898,391 A | 2/1990 | Kelly et al. | |
| 5,641,288 A | 6/1997 | Zaenglein, Jr. | |
| 5,924,868 A | 7/1999 | Rod | |
| 6,739,873 B1 | 5/2004 | Rod et al. | |
| 2008/0233543 A1 | 9/2008 | Guissin | |
| 2010/0178967 A1 | 7/2010 | Cheng et al. | |
| 2012/0258432 A1 | 10/2012 | Weissler | |
| 2014/0106311 A1 | 4/2014 | Skrepetos | |
| 2014/0367918 A1 | 12/2014 | Mason | |
| 2016/0209173 A1* | 7/2016 | Dribben | F41J 11/00 |
| 2016/0298930 A1* | 10/2016 | Squire | F41G 3/26 |

FOREIGN PATENT DOCUMENTS

CN        1347040 A      5/2002

OTHER PUBLICATIONS www_leapmotion_com.pdf, (2018).
Documentation_Leap_Motion_Developer.pdf, (2017).

* cited by examiner

*Primary Examiner* — Kurt Fernstrom
(74) *Attorney, Agent, or Firm* — Mark V. Loen

(57) ABSTRACT

The embodied invention features a combination display with four individual displays to facilitate handgun training with live fire. The first is a target display with a skeletal hand-arm position of a trainee. The second is a side view of the skeletal hand-arm position. The third a target display to provide for viewing the shots as they hit the target. The fourth display is a side view of the trainee as seen by a video camera. All of the displays are recorded during a live round target practice and immediately available for the trainee to view and learn about correct positioning and stability.

10 Claims, 3 Drawing Sheets

MULTIVIEW DISPLAY FOR HAND POSITIONING IN WEAPON ACCURACY TRAINING

CROSS REFERENCE TO RELATED APPLICATIONS

This application is related to U.S. patent application Ser. No. 15/474,874 now U.S. Pat. No. 9,891,028, entitled "Shooting Game for Multiple Players with Dynamic Shot position Recognition on a Paper Target", issued on Feb. 13, 2018, and owned by the inventor of this application. The disclosure of this related application is hereby incorporated by reference in its entirety.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION

(1) Field of the Invention

This invention is directed to training aids for individuals who desire to improve their ability to shoot accurately and quickly.

(2) Description of Related Art

Training in gun shooting is an important to safe and accurate use of firearms. Accuracy is improved when a steady arm position is maintained when firing multiple rounds. When an individual desires to improve, it is helpful to have a training system capable of accommodating the trainee's height and body. For repeatability when shooting, it is important that the arms/hand are in a repeatable position.

Firearms are utilized for a variety of purposes, such as hunting, sporting competition, law enforcement and military operations. Special equipment is used by security and police forces to improve their accuracy. Such equipment may include laser spotting and targeting equipment that provides a simulated shooting environment for a trainee. However, such facilities lack the needed response of the gun when shooting an actual round.

In conventional firearm training, a trainee is taught how to stand, aim, and fire a round. This involves aiming at various positions such as prone, sitting, or standing. In a shooting session of several rounds, accuracy is determined by examining the location of bullet holes in the target. However, the trainee is often unable to examine particular shots and correlate it to a particular shooting method as they are making minor adjustments; both good and bad.

In particular, some trainees have difficulty in recognizing how their hand positioning affects their shooting accuracy, and how important it is to avoid sudden trigger pulling movements. Also, trainees need to understand how important it is to position their arms correctly to handle gun recoil. A new trainee may assume that they are aiming wrong and adjust their aim rather than work on how they handle the gun just before firing.

There is a need in the art for a better way to correlate shooting accuracy with how a trainee is positioning their hands and arms when firing rounds. It is especially important for hand gun training.

BRIEF SUMMARY OF THE INVENTION

The embodied invention features a combination display with four individual displays to facilitate handgun training with live fire. The first is a target display with a skeletal hand-arm position of a trainee. The second is a side view of the skeletal hand-arm position. The third a target display to provide for viewing the shots as they hit the target. The fourth display is a side view of the trainee as seen by a video camera. All of the displays are recorded during a live round target practice and immediately available for the trainee to view and learn about correct positioning and stability.

BRIEF DESCRIPTION OF THE SEVERAL VIEWS OF THE DRAWING(S)

DETAILED DESCRIPTION OF THE INVENTION

The goal of the training session is to provide important self-instruction by facilitating views that aid the trainee when shooting at a target with live rounds. The trainee can compare their hands and arms position when looking at the accuracy of shot placement on the target. The trainee can then learn what position works the best for stability. Additionally, an instructor can view the recorded shot session, and offer insight as to what the trainee needs to address based on the recorded four view video. An important goal is to aid the trainee in quickly advancing in shooting expertise, without long hours of unproductive shooting practice.

Figure 1:
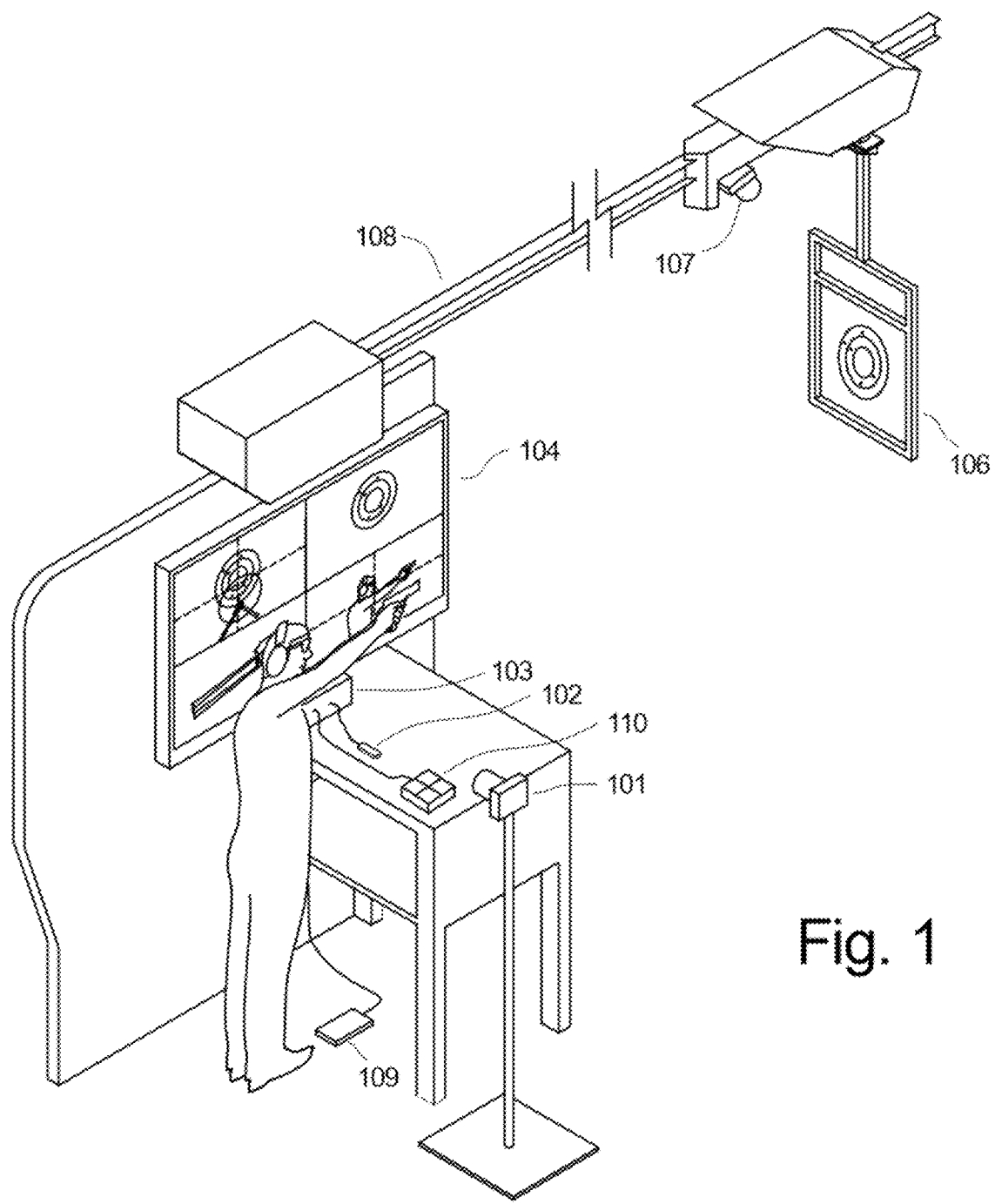
FIG. 1 shows the equipment layout for a live fire training session at a shooting range.

FIG. 1 shows the equipment set up for a training session. A side view camera 101 is connected to a computer 103 by wireless or by a suitable connection such as USB or ethernet. The side view camera records a side view of the trainee during a shooting session. An infrared sensor 102 detects the position of the trainee's arms and hands. It does this by an infrared sensor that utilizes two infrared cameras and a few illuminating infrared LEDs which illuminate the arms/hands of the trainees. The infrared cameras are spaced apart so as to provide depth (i.e. distance above the sensor) perspective. The infrared sensor 102 and the side view camera 101 are both connected to the computer.

A multi-view display 104 is connected to the computer and is available to the trainee. It will be discussed further in FIG. 2. A target camera 107 is connected to the computer and located near the target 106 to provide a view of the target as seen by the trainee. The target camera provides enhanced visualization of the shots as they hit the target. The target 106 is in a frame and is moved back and forward between the shooter and desired distance by a rail system 108. A button panel 110 is connected to the computer 103 and is used to rewind and play the training session recording, and to slow down the speed when desired. A keyboard could equally be used.

The sensor 102 utilizes dual infrared cameras to track the position of the hands and arms. The cameras are separated to provide for depth perception utilizing the differences between the two camera images, similar to what human eyes do. The sensors look only at the infrared wavelength, and the arms-hands are illuminated by three infrared LEDs in line with the cameras. To keep power within the minimum amount that a USB power supply can provide, the LED's are pulsed and matched to the camera's frame rate. The sensor communicates with the training computer which identifies more than 21 points for each hand. Individual fingers are recognized including finger digits. One point represents the Palm of the hand, one point for the wrist, and 4 points for each arm. A rectangular projection of the arms approximates the Ulna and Radius bones with straight lines.

Only hands and arms are shown in a skeletal matter. The arm/hand identifying software withholds the arm skeletal projection of the if the hands cannot be identified due to hand positioning out of range or overlapping too much. The hand position and skeletal recognition is preferably done with only a single sensor 102.

To avoid jitter from the sensor which can operate up to 200 frames per second, an average of multiple frames removes the jitter. The image is then a sequential display of frame averaging.

The 2 infrared cameras see depth and are able to find or interpret that position of the hands in a 3D area above the sensor. The goal of the software is to provide feedback during a live fire at a target situation. Also, a laser gun or pellet gun could be used.

Figure 2:
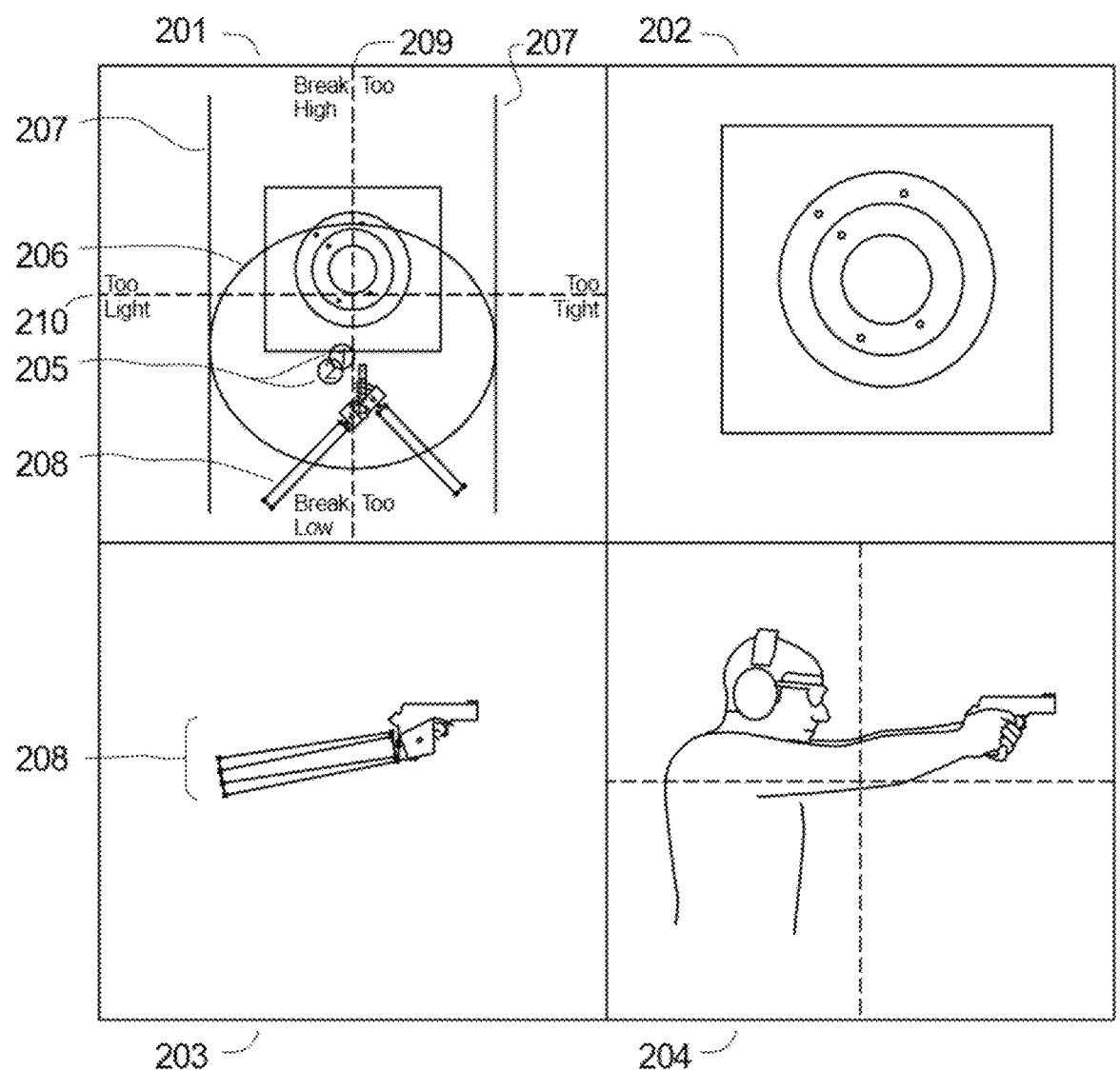
FIG. 2 is a close up of the Multiview display.

FIG. 2 is an illustration of 4 views that are combined on a single monitor display:

1. The upper left screen display 201 shows a hand calibration bubble 206 in crosshairs and a view update target as seen by the trainee with skeletal hands-arms 208.
2. The lower left view screen display 203 shows a side view of the trainee's skeletal hands-arms 208 holding the gun.
3. The upper right screen display 202 is a close up of the target so that shots can readily be seen by the trainee.
4. The lower right screen 204 is a side view video recorder of the trainee holding the gun. The video is recorded during the shooting (i.e. after foot pedal is pressed). It is a live view.

Other orientations of the four view display could equally be used, such as the lower right screen being a side view of the skeletal hands, the upper right display being a side view of the trainee, etc.

All four views are recorded during a shot training session and available for replay so that the trainee can identify their position flaws and variances. The shot training session utilizes live fire, that is, real bullets are fired from a gun.

A software development kit associated with the sensor is utilized to create customized programming to 1. Identify the position of the hands,
2. Determine the position of the hand calibration bubble 206,
3. Determine and the position of the vertical 209 and horizontal 210 dashed lines
4. Overlay the hand calibration bubble 206 and the vertical and horizontal lines (209, 210) on the upper left screen.

Every five seconds, the position of the hands holding the gun is marked 205 on the upper left screen 201 as illustrated in FIG. 2. This provides a record of hand position motion during a trainee multi shot sequence. A number is attached to each circular marking to aid in understanding how the hands moved.

An oval or circular hand calibration bubble 206 is projected on the screen when the trainee presses a foot calibrate pedal 109, which also starts the trainee shot session. The bubble then projects on the screen based on the hands of the trainee position, as measured by the infrared sensor 102.

The hand calibration bubble 206 is used to establish an initial hand position for differing heights of the trainee, and different holding heights. Some trainees are short (or tall) and have short arms (or long); and the hand calibration bubble aids in allowing the training session to establish a circle of acceptable hand positions. The bubble is not to scale on the screen and is an additional visual aid for hand position tracking. The size of the bubble is fixed and is not calibrated to the trainee's height, arm length, or body position. The hand calibration bubble will be visible but not locked into position until the trainee presents his hands within the sensor range and is not moving.

As seen in FIG. 2, a shooting width 207 is marked on the screen with two vertical lines when the foot calibrate pedal 109 is pressed. The shooting width provides a recommended window of acceptable hand positions based on the initial position of the hands. The shooting width 207 is fixed and is not calibrated to the trainee's height. Either the shooting width 207, the hand calibration bubble 206, or both could be marked on the screen.

The crosshair dashed lines in the upper left view 201 and the lower right view 204 are based on the camera position. They are not calibrated to a shooter position. The dashed lines are guides for how the gun is held. The vertical dashed line 209 indicates whether the gun is held too high (Break Too High) or too low (Break Too Low). The horizontal line 210 indicates whether the gun is held too loose (Too Light) or too tight (Too Tight). The guide lines do not have to be centered on the target.

Figure 3:
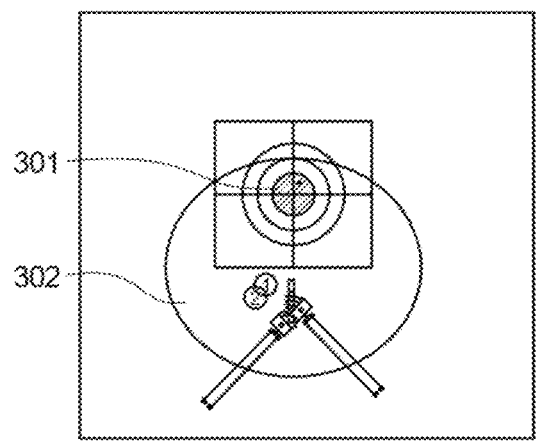
FIG. 3 shows certain features of the Multiview display.

FIG. 3 illustrates how a score for the player is identified when a satisfactory shot is made (within a certain distance from target center 301) and within an acceptable hand position (i.e. hand position within hand calibration bubble 302 or shooting width). For example, the score would be 50% for 6 out of 12 shots when both criteria are met. Flexibility to establish an acceptable shot on target region and the size of the hand calibration bubble is part of the training session design. The target camera 107 is used as part of scoring an acceptable shot.

The embodied invention is primarily conceived for hand gun training when firing live rounds. However, similar weapons that utilize two hands in close proximity and shooting at a target could equally be utilized. This would include pellet guns, paint ball guns, air operated guns, etc.

The preferred use of the training apparatus would be indoors at a target practice shooting range. However, by creating a suitable environment for cameras and a computer that protects them from the elements, an outdoor use is equally created.

See U.S. Pat. No. 9,891,028 for a method of identifying and scoring shot on a paper target when using a camera.

For example, a 1080p wireless camera (1080×1920 pixels) with over 2 million pixels is used to monitor the paper target, and the paper target is mounted inside a metal frame. The frame is designed to fit the target paper tightly so that the alignment between the camera is maintained and a set up calibration is not needed. The camera is positioned in front of the target, and above it, so that the camera obtains a high resolution image of the target. The alignment between the target and the camera is a set up function at the beginning of a shooting session. Preferably, the camera is kept at a fixed distance and position from the target to simplify the set up and accuracy of the camera's image. Pixel changes due to a bullet impact in an image frame are used to identify a shot. The image from the camera is continuously monitored to recognize the location of the shot and score its position accurately.

Figure 4:
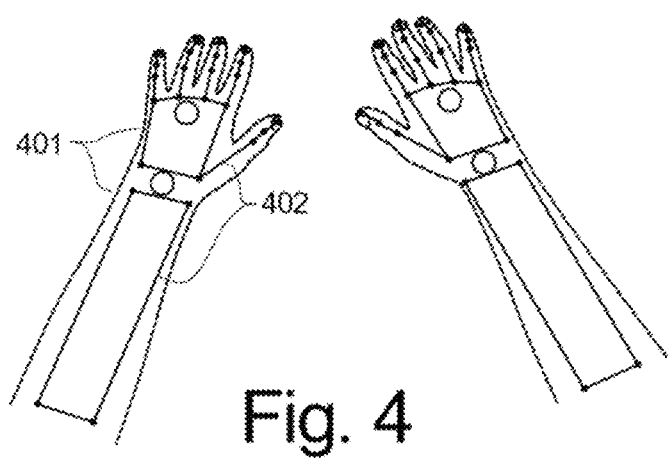
FIG. 4 illustrates how the hands and arms are converted to a skeletal representation.

FIG. 4 illustrates how the skeletal hands and arms are recognized. The hands and arms 401 are converted to the skeletal representation 402 by identifying and matching the joints such as a wrist, finger digits.

The computer specifications needed to identify the skeletal hand position, the bubble center, and view projection are:
 1. At least 8 and preferably 16 gigabytes of random access memory
 2. Intel I7 chip running at 2.8 gigahertz.
 3. Dedicated video board with at least 2 gigabytes of memory, and preferably 8 gigabytes.
 4. Solid state hard drive.
 5. Monitor with at least 1080p resolution for the multi-view display One main goal of the training session is for the trainee to recognize how their shooting hand position is related to the and the resultant position of the shot on the target. The display is especially created for the trainee to see this in a multi view display. In particular, the display shows a how a trainee is holding their arms and the gun at the moment of shooting. This can be compared to known faults, such as:
 1. Pulling trigger quickly—shots tend to be low and left of the target
 2. Tight gun grip—shots tend to be low and right of the target
 3. Incorrect finger trigger position—shots tend to be left of the target
 4. Thumb push on gun—shots tend to be right of the target
 5. Anticipating recoil by moving gun—shots tend to be high and left of target
 6. Anticipating recoil by aiming low—shots tend to be low of the target
 7. Anticipating recoil by pushing gun—shots tend to be right and mildly elevated By replaying the training session video with shooting results on the target, a trainee learns quickly what is causing their aiming problems. To do better, they learn correct positioning faults rather than compensating by changing where they aim. The trainee can operate the speed of the playback, so that the moments just prior to the shot being fired can be scrutinized. Additionally, an instructor can review the display with the trainee, and help the trainee understand why they are inaccurate.

A shot training session begins when the trainee presses the foot pedal. The computer then establishes the hand calibration bubble (or shooting width zone), starts recording both cameras (side view and target), and watches the target to identify shot position based on any pixel change. The shot training session ends when a timer is done, or the trainee presses the foot pedal again. The video is then stored on the computer hard drive, the shot scoring is made, and the multi-view video monitor is frozen. The trainee then presses a rewind button on the pad to rewind and look at the four view display. When done, the trainee follows a menu that clears the screen and the computer becomes ready to start the next training session.

As used herein the terms central computer and computer system are intended to refer to a computer-related entity, comprising either hardware, a combination of hardware and software, software, or software in execution capable of performing the embodiments described. The disclosed embodiments which use the central computer refer to being interfaced to and controlled by a computer readable storage medium having stored thereon a computer program. The computer readable storage medium may include a plurality of components such as one or more of electronic components, hardware components, and/or computer software components. These components may include one or more computer readable storage media that generally store instructions such as software, firmware and/or assembly language for performing one or more portions of one or more implementations or embodiments of an algorithm as discussed herein. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or solid-state or electronic memory. Other forms of non-transitory and/or tangible computer readable storage media not list may be employed with the disclosed embodiments.

A number of such components can be combined or divided in an implementation of a computer system. Further, such components may include a set and/or series of computer instructions written in or implemented with any of a number of programming languages, as will be appreciated by those skilled in the art. Computer instructions are executed by at least one central processing unit. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

I claim:

1. Apparatus that provides a multi view visual display for a weapon accuracy training session comprising:
 A) a computer,
 B) a monitor display connected to said computer, wherein said monitor display is separated into four views,
 C) a hand and arm position sensor connected to said computer, wherein said hand and arm position sensor is used to create a skeletal hands and arms image,
 D) a trainee interface pad connected to said computer,
 E) a target camera connected to said computer,
 F) a side view camera connected to said computer,
 G) a foot pedal connected to said computer,
 H) a target,
 I) wherein said four views further comprises:
  i. a first view showing said target from said target camera,
  ii. a hand position reference shown on said first view further comprising:

a. a hand calibration bubble, or
b. two vertical lines,
iii. said skeletal hands and arms image is shown on said first view,
iv. a second view showing a side view of skeletal hands and arms image,
v. a third view showing a second target view from said side view camera, and
vi. a fourth view showing a side view of a trainee.

2. The apparatus according to claim 1 wherein said foot pedal is an on off switch for a training session.

3. The apparatus according to claim 2 wherein said two vertical lines establishing an acceptable hand positioning width for said trainee when said foot pedal is pressed.

4. The apparatus according to claim 2 wherein said hand calibration bubble is established for said trainee when said foot pedal is pressed.

5. The apparatus according to claim 2 wherein top and side views are recorded via video during said training session.

6. The apparatus according to claim 2 wherein a score is created during a training session based on the hand position being recorded within a scoring area and a shot position being within a scoring area.

7. The apparatus according to claim 2 wherein a vertical break guide line and a horizontal grip guide line are overlaid on said first view.

8. A method of providing multi view display for a weapon accuracy training session comprising:
A) Providing:
I) a computer,
II) a monitor display connected to said computer, wherein said monitor display is separated into four views,
III) a hand and arm position sensor connected to said computer, wherein said hand and arm position sensor is used to create a skeletal hands and arms image,
IV) a trainee interface pad connected to said computer,
V) a target camera connected to said computer,
VI) a side view camera connected to said computer,
VII) a foot pedal connected to said computer,
VIII) a target,
IX) wherein said wherein said four views further comprises:
a. a first view showing said target from said target camera,
b. a hand position reference shown on said first view further comprising:
i. a hand calibration bubble, or
ii. two vertical lines,
c. said skeletal hands and arms image is shown on said first view,
d. a second view showing a side view of said skeletal hands and arms image,
e. a third view showing a second target view from said side view camera, and
f. a fourth view showing a side view of a trainee,
B) activating said training session when said foot pedal is pressed,
C) utilizing said hand and arm position sensor to establish a position of said hand calibration bubble on said first view,
D) recording all views,
E) stopping said training session when said foot pedal is pressed or a definite time has elapsed, and
F) displaying any portion of said recording according to the use of said trainee interface pad.

9. The method according to claim 7 wherein a score is determined according to:
A) a hand position within
a. said hand calibration bubble, or
b. said two vertical lines,
and
B) a shot result on said target within a predetermined distance from the target center, when a shot is fired at said target.

10. The method according to claim 9 wherein an average of at least two images from said hand and arm position sensor are used for display and scoring.

* * * * *